INVENTORS
JEROME ALFRED CHERNEY
HUBERT JOSEPH GERMINT
ELBERT WILLIAM PERRY
BY Robert P. Auber
George W. Rezbur
ATTORNEYS

INVENTORS
JEROME ALFRED CHERNEY
HUBERT JOSEPH GERMIAT
ELBERT WILLIAM PERRY

ATTORNEYS

United States Patent Office 3,311,681
Patented Mar. 28, 1967

3,311,681
METHOD OF EXTRUDING A FOAMED PLASTIC SHEET HAVING A SKIN ON ONE SURFACE
Jerome Alfred Cherney and Hubert Joseph Germiat, Fox River Grove, and Elbert William Perry, Wonder Lake, Ill., assignors to American Can Company, New York, N.Y., a corporation of New Jersey
Filed Oct. 28, 1960, Ser. No. 66,380
4 Claims. (Cl. 264—48)

The instant invention relates to the method of producing a foamed plastic article having particular surface characteristics. More particularly, it pertains to the method of producing a foamed plastic article, the opposite surfaces of which have markedly varying slip characteristics.

The present invention will be described with relation to foamed polystyrene. However, it is to be understood that it is equally applicable to other foamable plastics which have characteristics similar to foamed polystyrene and may be produced in a similar manner. Further, the term "foamed polystyrene sheet" as used herein is meant to designate an article having two surfaces larger in area than any other single surface of the article. This definition is meant to include thin, i.e. a thickness less than 0.125 in., flexible sheets of foamed plastic, either flat, i.e. the planes in which each large surface lies are parallel to one another, or in some other shape such as formed into a container. Such a container may be formed wholly of the foamed polystyrene sheet; or may be formed of a laminate of the foamed polystyrene sheet and a supporting member such as paper. The foamed polystyrene sheet has a density of from 3 to 10 and preferably about 5 lbs. per cu. ft. In some very special applications, sheet densities as high as 35 lbs. per cu ft. might be used.

Thin, flexible foamed polystyrene film may be formed by heating expandable beads of foamable polystyrene to a fluid, plastic state in an extruding machine, extruding this expansible fluid mass through an orifice or die opening, at which time foaming of the plastic takes place to form a foamed polystyrene sheet composed of a multitude of expanded individual thin walled cells joined to one another. One such operation is disclosed in U.S. Patent 2,917,217, issued to J. B. Sisson.

This thin, flexible foamed polystyrene has found utility as an insulating ply in the walls of a container. This utility is fully spelled out in the above-mentioned Sisson patent. However, a serious disadvantage encountered with containers made from such a laminate is that the exposed surface of the foamed polystyrene has a high coefficient of friction, so that it exhibits a great deal of resistance to sliding over other smooth surfaces, especially when subject to even light compression. This disadvantage makes itself apparent when container blanks in flat form are stacked with the surface of the foamed polystyrene ply of one blank in contact with a relatively smooth surface of the next adjacent container blank and individual blanks are to be fed into a machine from such a stack. The high coefficient of friction of the foamed polystyrene surface inhibits easy sliding of one blank out of contact with the stack and into the machine. Also, when the foamed polystyrene forms the inside or outside ply of a tapered cup, upon stacking of these cups, as is done in automatic vending machine, the cups tend to stick together with subsequent failure of a cup to release from the stack at the appropriate time.

It is therefore an object of the present invention to manufacture a foamed polystyrene sheet, one surface of which has a lower coefficient of friction than the surface opposite thereto.

A further object is to manufacture a foamed polystyrene sheet having one surface which deforms less readily when moderately compressed than its opposite surface.

Still a further object is to manufacture a foamed polystyrene sheet, one side of which has a soft, satiny feel, and the side opposite thereto has a relatively hard, pebbly feel.

Yet another object is to provide a method of producing different surface characteristics in a sheet of foamed polystyrene.

Yet a further object is to provide a method of producing foamed polystyrene sheet of the character described, which requires a minimum of change to existing procedures for producing thin, flexible foamed plastic.

Numerous other objects and advantages of the invention will be apparent as it is better understood from the following description, which, taken in connection with the accompanying drawings, discloses a preferred embodiment thereof.

The aforementioned objects are accomplished by impinging a stream of gas against one surface of a foamed polystyrene sheet or film immediately after it leaves an extruding orifice and before complete foaming or formation of the individual cells adjacent to the impinged surface is accomplished so that in the finished foamed sheet, the cells adjacent to the impinged surface are smaller and more rigid than the cells remote from this surface. The walls of these smaller, more rigid cells which define the impinged surface have greater load bearing strength than surfaces defined by cell walls which have not been so treated.

Referring to the drawings:

FIG. 7 is an enlarged fragmentary view partly in section showing a portion of apparatus of FIG. 1.

Figure 1:
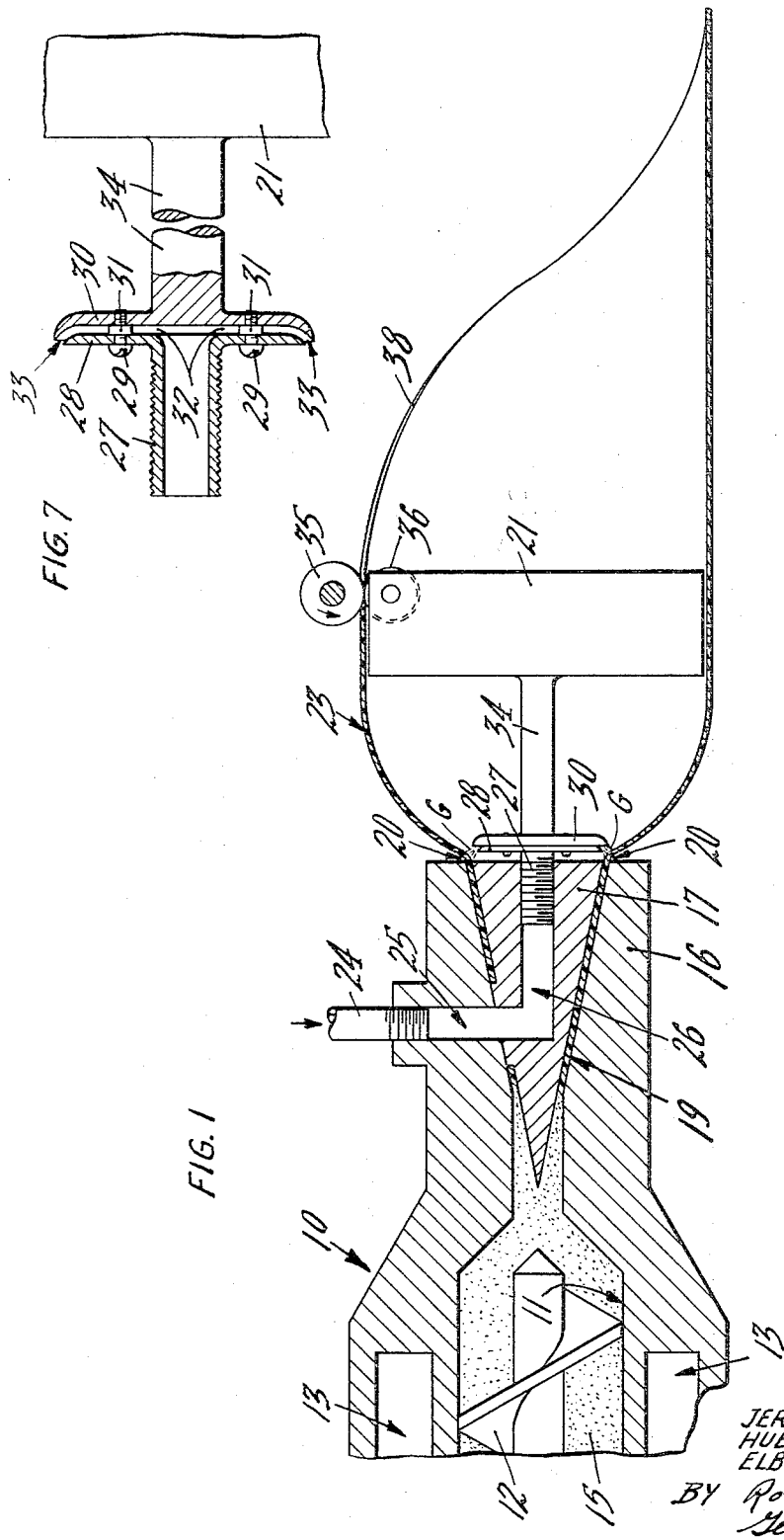
FIGURE 1 is a sectional view schematically illustrating the formation of foamed plastic.

In the preferred or exemplary embodiment of the instant invention, a charge of foamable polystyrene beads is fed into a conventional screw-type extruder generally designated 10 from a hopper (not shown). These beads are transferred through the barrel 11 of the extruder by means of a screw 12 rotated by a suitable source of power (not shown). The extruder 10 is heated by any suitable means, such as by circulating a heating fluid through channels 13 circumscribing the barrel 11. This heating melts the plastic to a fluid mass 15 and raises above its atmospheric boiling point an expanding or blowing agent such as n-pentane contained in the polystyrene beads. Also included in the plastic mass is a nucleating agent to aid in the formation of small cells and to inhibit the tendency of the cells to collapse. Volatilization of the blowing agent and expansion of the plastic is prevented within the extruder 10 by virtue of the confinement of the fluid mass therein.

The rotation of the screw 12 forces the plastic mass or melt toward an extrusion head 16. In its forward travel (toward the left as viewed in FIG. 1) the melt is forced around a substantially conical insert 17. The outer surface of the insert 17 is spaced from the inner surface of the head 16 to define therebetween an extrusion channel 19 of predetermined size. The extrusion channel 19 terminates in an extrusion orifice 20 defined by the base of the conical insert 17 and the surrounding periphery of the extrusion head 16. The fluid plastic, as it leaves the orifice 20, forms an annulus, the forward end of which passes over a cylindrical sizing mandrel 21 to form a closed tube 23. Simultaneously with the exit of the fluid plastic from the orifice 20, volatilization of the expanding or blowing agent occurs due to the reduction in external pressure, thereby forming a multitude of individual but integral closed cells within the plastic sheet constituting the tube 23.

A pipe 24 is threadedly secured in the entrance opening of a bore or channel 25 extending through the extrusion head 16. A channel 25 coincides with a channel 26 extending into and through the insert 17. A pipe 27 has one end threadely secured in the exit end of the channel 26 and its opposite end extending into the plastic tube 23.

A gas G, such as air, is fed from a suitable source (not shown) into the pipe 24 through the channels 25, 26, and into the pipe 27. The end of the pipe 27 extending into the tube 23 terminates in a flange 28 (FIG. 7). The major portion of the flange 28 extends radially from the pipe 27, with the outermost periphery of this flange turned backwardly toward the extrusion orifice 20 and tapering to an edge. A plurality of machine screws 29, e.g. four or more, disposed in a circular pattern extend through the radial portion of the flange 28 and are threadedly secured in a circular plate 30. By means of a spacer 31 on each of the screws 29, the plate 30 is mounted a predetermined distance from the flange 28 defining therebetween a radial passage 32 for the escape of the gas G. The outer extremity of the plate 30 is turned toward the orifice 20 and tapered in the same manner as the flange 28 to define therebetween a peripheral slot 33. The slot 33 directs the gas G into contact with the inside surface of the film 23 as close to the orifice 20 as possible so that contact between the gas and the surface takes place while the plastic is still in a heated, deformable state and before full expansion of the cells. Extending from and integral with the side of the plate 30 remote from the pipe 27 is a supporting bar or rod 34, the opposite end of which is integral with and supports the mandrel 21.

At one portion, preferably the uppermost, of the periphery of the mandrel 21, the tube 23 is slit longitudinally by passage between a cutter wheel 35, mounted above the mandrel 21, and a back-up roller or wheel 36 mounted for free rotation within the mandrel 21. The cutter wheel 35 is driven from a suitable source of power (not shown) so as to rotate in the direction of travel of the tube 23. The slit tube is then opened outwardly to form a sheet 38 which is subsequently flattened and wound into a coil by any suitable mechanism (not shown). The coil winding mechanism is power driven so as to provide forward motion (to the right as viewed in FIG. 1) to the tube 23 and the sheet 38.

While the tube 23 is still in a hot, deformable condition after it leaves the orifice 20, the walls thereof are thinned down to a predetermined thickness. This thinning is controlled by throughput of molten plastic, the diameter of the mandrel 21 and the forward speed of the tube 23. The gas issuing from the slot 33 not only cools the inner surface of the tube 23 as it is extruded, but also produces a pressure within the tube. This pressure expands and supports the hot, deformable tube as it moves forwardly over the mandrel. Gas escaping between the inner surface of the tube 23 and the outer peripheral surface of the mandrel 21 maintains this pressure at an operable level. This escaping gas also provides a lubricating and cushioning film between the two surfaces.

The temperature of the melt, i.e. molten, expansible plastic, as it leaves the die lips or extrusion orifice 20 is not precisely known, due to the obvious difficulty of measuring temperatures at that point. However, the temperature of the melt as it enters the extrusion channel 19 is readily measurable. Further, the extrusion die itself, i.e. the head 16 and insert 17, is maintained at a temperature above that of the melt in the channel 19. Therefore, it is reasonably assumed that the temperature of the melt as it leaves the die lips is greater than its temperature as it enters the channel 19.

The actual temperature of the melt will vary higher or lower from one foamable plastic material to another. Either higher or lower melt materials are operable in the present invention. One lower melt material to which the invention has been successfully applied has a temperature as it enters the channel 19 of from 230 to 240° F., preferably 235° F. With such a material, the die is maintained at a temperature of 275° F., so that the melt, as it emerges from the orifice 20, would probably have a temperature of about 260-265° F. Higher melt materials used enter the channel 19 at a temperature of from 235 to 245° F. and preferably 240° F., pass through a die heated to 275° F. and emerge from the die lips at a temperature of about 265 to 270° F.

The gas G issuing from the slot 33 has a temperature lower than the temperature of the melt emerging from the orifice 20 and forming the tube 23. The gas G directed against the inner surface of tube 23 as it emerges from the orifice 20 cools this surface. Impingement of the gas against the inner surface of the tube 23 does not appreciably cool the other portions of the emerging tube. These other portions maintain their hot, deformable condition so that expansion of the tube and thinning of its walls can be accomplished. This cooling of the inner surface of the tube 23 causes the cells, the walls of which form this surface, to have characteristics different from the cells in the remainder of the film or sheet 38. This difference will be described more fully hereinafter.

The gas G impinging upon the inner surface of the tube 23 adjacent the orifice 20 may have any temperature below the temperature of the impinged surface, so that cooling of the surface occurs. However, since the rate of cooling will vary directly with the temperature differential between the gas and the impinged surface, it is preferred that this temperature differential be substantial. We have found that if the temperature differential is too great, excessive solidification or setting-up of the extruded melt occurs. With such an occurrence, full expansion and sizing of the tube 23 is prevented, with consequent breaking or tearing of the tube. For many operations, a gas temperature from 170–190° F. and particularly about 180° F. below the temperature of the melt at the orifice 20 is preferred. For example, when operating with the lower melt material specified hereinbefore, we have obtained optimum results by using, as the gas G, air at room temperature, i.e. 85° F. However, when operating with the previously disclosed higher melt material, good results were obtained by using air heated to 135° F. If necessary, heating of the gas G may be accomplished by any suitable means.

It is to be understood that the outside surface of the tube 23 rather than its inside surface could be treated by omitting the internal blower unit and mounting an annularly shaped ring around the tube 23 adjacent the orifice 20 in a manner similar to that shown in Modern Plastics Encyclopedia for 1960, page 689, FIG. 7, for treating non-foamed, solid plastic. Means for injecting gas into the interior of the tube 23, such as the pipe 27, would still be needed to inflate the tube. The annular ring could cool the outer surface of the tube 23 either by blowing a gas thereagainst as shown in the above-mentioned FIG. 7; or it could be imperforate and cooled and have its inner surface in contact with the tube 23. However, this alternate method and apparatus are considered more cumbersome and less efficient than the preferred embodiment.

As mentioned above, the single sheet 38 formed by slitting the tube 23 is wound into a coil. Thereafter, it may be used for any desired subsequent operation, such as laminating to a supporting surface such as paper and used in the production of a desired commercial article, such as a box, container, etc. The film may be used as such without lamination, for example in the formation of a convolutely wound, multi-ply container.

Figure 2:
FIG. 2 is a view of reproduction of a photomicrograph showing a foamed plastic surface treated in accordance with the present invention.
Figure 3:
FIG. 3 is a view taken substantially along line 3—3 of FIG. 2.
Figure 4:
FIG. 4 is a view similar to FIG. 2 but showing the opposite, untreated surface of the foamed plastic.

In FIGS. 2 and 4, the light or white areas are high areas on the surface; and conversely, the dark or black areas in these figures indicate low areas. Since the ratio of light to dark areas is greater in FIG. 2 than FIG. 4, it is obvious that the gas cooled surface (FIG. 2) is much more uneven than is the uncooled surface (FIG. 4). It is further apparent from the cross section shown in FIG. 3 that there is a greater number of cells adjacent the gas cooled surface. This cross-sectional view further indicates that the cell size increases more or less gradually from the gas cooled surface to the uncooled surface.

Without wishing to be bound by any particular theory, it is believed that the gas impingement and cooling operation solidifies the plastic forming the cell walls before full expansion of the cells takes place, thereby accounting for the smaller cells adjacent the gas cooled side of the film.

Figure 5:
FIGS. 5 and 6 are views of FIGS. 2 and 4 respectively but with the foamed plastic surface of each compressed.
Figure 6:

The cell walls defining the gas cooled surface are more rigid and less flexible than the cell walls defining the uncooled surface. This effect is graphically illustrated in FIGS. 5 and 6. FIGS. 5 and 6 are, respectively, the same surfaces illustrated in FIGS. 2 and 4, but each with a compressive load of 1000 grams/inch$^2$ placed thereon. It can be readily seen from a comparison of the unloaded surface with the loaded surface that the gas cooled surface (FIGS. 2 and 5) have changed relatively slightly in appearance; whereas in the uncooled surface (FIGS. 4 and 6) a substantial change in appearance has taken place. This change is indicated by the appreciable increase in ratio of light or high area to dark or low area by loading the uncooled surface, as opposed to only a slight increase in this ratio in the cooled surface.

This greater compressibility of the uncooled surface compared to the cooled surface markedly affects the frictional characteristics or coefficient of the friction of these two surfaces. Experimentation has shown that a great deal more force is required to slide a given surface over the uncooled plastic surface than is required to slide the same surface over the cooled plastic. For example, in a foamed polystyrene sheet produced by the instant method, the uncooled surface will have a cofficient of friction, measured against glass, between 3 and 6 times greater than that of the cooled surface.

The following table sets forth data showing the marked difference in slip characteristics between opposed surfaces of a foamed polystyrene sheet produced in accordance with the present invention. These data were obtained by pulling a sled over a foamed plastic sheet at a rate of 1.3 cm. per min. The sled had a glass surface 3.25 in. x 4 in. (84 cm.$^2$) in contact with the foamed plastic surface. The normal force (N) pressing the glass and plastic surfaces together was varied by loading the sled with different weights. The pulling force required to slide the glass surface over the foamed plastic surface at the specified rate was measured by means of a Riehle Tensile Tester calibrated at 0.2 lb. per scale division. The reading on the tensile tester is equal to the frictional force (f) resisting sliding. The coefficient of friction, K, was calculated for each foamed plastic surface by substituting the appropriate values in the equation $$K = f/N$$

| Run No. | Friction | Sled+Wts. (Grams) | | | | | | | | |
| --- | --- | --- | --- | --- | --- | --- | --- | --- | --- | --- |
| | | 1,200 | | | 2,200 | | | 3,200 | | |
| | | Grams Pull | K | Ratio | Grams Pull | K | Ratio | Grams Pull | K | Ratio |
| 1 | Low | 725 | 0.60 | 1:4.0 | 1,410 | 0.64 | 1:3.9 | 2,090 | 0.65 | 1:3.5 |
| | High | 2,860 | 2.38 | | 5,450 | 2.48 | | 7,250 | 2.26 | |
| 2 | Low | 755 | 0.63 | 1:4.0 | 1,590 | 0.72 | 1:3.5 | 2,590 | 0.81 | |
| | High | 3,000 | 2.50 | | 5,550 | 2.52 | | (film broke) | | |
| 3 | Low | 755 | 0.63 | 1:5.4 | 1,455 | 0.66 | 1:4.8 | 2,180 | 0.68 | |
| | High | 4,100 | 3.42 | | 7,000 | 3.18 | | (film broke) | | |
| 4 | Low | 635 | 0.53 | 1:5.4 | 1,410 | 0.64 | 1:4.1 | 2,085 | 0.65 | 1:3.5 |
| | High | 3,450 | 2.87 | | 5,800 | 2.64 | | 7,350 | 2.30 | |

The advantage of the foamed polystyrene of the instant invention is readily apparent. If it is desired to produce an article comprising a thin foamed polystyrene, which sheet has a high coefficient of friction with respect to other surfaces, it is necessary merely to form this article with the uncooled surface facing outwardly where it can contact another surface. Conversely, if a low coefficient of friction is desired, the article can be formed with the gas cooled surface of the foamed polystyrene facing outwardly. As indicated hereinbefore, this construction finds particularly utility in the formation of tapered, nested cups. In this use, the thin, flexible foamed polystyrene sheet is laminated to paper with the uncooled surface adhered to the paper and the low friction, gas cooled surface facing outwardly. When such a laminate is formed into a tapered cup with the foamed polystyrene on the inside and/or outside thereof and such cups are nested, each cup readily releases from a stack thereof.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

We claim:

1. In a method of making a foamed plastic sheet composed of a multitude of integral, thin-walled cells, including the steps of feeding a foamable fluid plastic to a die opening, extruding said plastic through said opening to form a tube, foaming said plastic simultaneously with said extrusion, closing said tube, and blowing a gas into said closed tube to expand the same, the improvement comprising impinging a gas against one surface of said tube adjacent said die opening, said gas having a lower temperature than said impinged surface whereby the cells contiguous said impinged surface are cooled.

2. The method set forth in claim 1 wherein said gas is impinged against the inside surface of said tube.

3. The method set forth in claim 1 wherein the temperature of said impinging gas is from 170 to 190° F. below the temperature of said impinged surface.

4. The method set forth in claim 1 wherein said gas is air.

(References on following page)

References Cited by the Examiner

UNITED STATES PATENTS

| | | |
|---|---|---|
| 2,150,287 | 3/1939 | Minor. |
| 2,401,642 | 6/1946 | Hiltner et al. |
| 2,634,459 | 4/1953 | Irons. |
| 2,708,772 | 5/1955 | Moncrieff. |
| 2,750,631 | 6/1956 | Johnson. |
| 2,857,625 | 10/1958 | Carlson. |
| 2,888,415 | 5/1959 | Jankens _____ 260—2.5 |
| 2,905,972 | 9/1959 | Aykanian et al. |
| 2,917,217 | 12/1959 | Sisson. |
| 2,926,389 | 3/1960 | Garlington. |
| 2,945,828 | 7/1960 | Henning _____ 260—2.5 |

FOREIGN PATENTS

| | | |
|---|---|---|
| 1,242,535 | 8/1960 | France. |
| 714,194 | 8/1954 | Great Britain. |
| 854,586 | 11/1960 | Great Britain. |

ALEXANDER H. BRODMERKEL, *Primary Examiner.*

WILLLIAM J. STEPHENSON, EARL BERGERT, *Examiners.*

S. NEIMARK, R. J. CARLSON, P. E. ANDERSON, *Assistant Examiners.*